(12) United States Patent
Haynes

(10) Patent No.: US 9,638,326 B2
(45) Date of Patent: May 2, 2017

(54) ARCH-BOUND RING SEAL AND RING SEAL SYSTEM INCLUDING AN ARCH-BOUND RING SEAL

(71) Applicant: George Perry Haynes, Baltimore, MD (US)

(72) Inventor: George Perry Haynes, Baltimore, MD (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 67 days.

(21) Appl. No.: 14/569,837

(22) Filed: Dec. 15, 2014

(65) Prior Publication Data

US 2016/0169389 A1 Jun. 16, 2016

(51) Int. Cl.
  *F16J 15/44* (2006.01)
  *F16J 15/32* (2016.01)
  *F16J 15/26* (2006.01)
  *F16J 15/3244* (2016.01)

(52) U.S. Cl.
  CPC ............. *F16J 15/26* (2013.01); *F16J 15/441* (2013.01); *F16J 15/442* (2013.01); *F16J 15/3244* (2013.01)

(58) Field of Classification Search
  CPC ...... F16J 15/3244; F16J 15/3488; F16J 15/44; F16J 15/441; F16J 15/442
  See application file for complete search history.

(56) References Cited

U.S. PATENT DOCUMENTS

| 980,282 | A | | 1/1911 | Junggren |
| 1,041,534 | A | | 10/1912 | Wagner |
| 3,575,424 | A | | 4/1971 | Taschenberg |
| 3,640,541 | A | | 2/1972 | Taschenberg |
| 4,082,296 | A | | 4/1978 | Stein |
| 4,145,058 | A | | 3/1979 | Hady et al. |
| 4,546,985 | A | | 10/1985 | Forch |
| 4,733,873 | A | | 3/1988 | Takenaka et al. |
| 5,066,026 | A | | 11/1991 | Heck et al. |
| 5,145,189 | A | | 9/1992 | Pope |
| 5,169,159 | A | | 12/1992 | Pope et al. |
| 5,301,957 | A | | 4/1994 | Hwang et al. |
| 5,368,313 | A | * | 11/1994 | Hudson ............... F16J 15/4472 277/422 |
| 5,509,664 | A | | 4/1996 | Borkiewicz |

(Continued)

OTHER PUBLICATIONS

Co-pending U.S. Appl. No. 14/132,571, for "Bidirectional Lift-Off Circumferential Shaft Seal Segment and a Shaft Seal Including a Plurality of the Segments," filed Dec. 18, 2013.

(Continued)

*Primary Examiner* — Nicholas L Foster
(74) *Attorney, Agent, or Firm* — Mark Ussai; SKF USA Inc. Patent Dept.

(57) ABSTRACT

A ring seal for a shaft includes a plurality of arc-shaped ring segments, each of the plurality of ring segments having a radially outer face, a radially inner face, a first axial side face, a second axial side face, a first end and a second end, a spring holding the plurality of arc-shaped segments in an arch-bound configuration, and at least one circumferential ramp in the radially inner face of each of the plurality of ring segments configured to generate an air cushion when a shaft rotates inside the ring seal. Also a ring sealing system including the ring seal and a shaft.

13 Claims, 4 Drawing Sheets

(56) References Cited

U.S. PATENT DOCUMENTS

| | | | |
|---|---|---|---|
| 5,516,118 A * | 5/1996 | Jones | F16J 15/3488 |
| | | | 277/400 |
| 5,558,341 A | 9/1996 | McNickle et al. | |
| 6,145,842 A | 11/2000 | Zellers et al. | |
| 6,145,843 A | 11/2000 | Hwang | |
| 6,692,006 B2 * | 2/2004 | Holder | F16J 15/442 |
| | | | 277/346 |
| 7,144,016 B2 | 12/2006 | Gozdawa | |
| 7,377,518 B2 | 5/2008 | Lai | |
| 7,432,620 B2 | 10/2008 | Freal et al. | |
| 7,540,501 B2 | 6/2009 | Flaherty | |
| 7,762,558 B2 | 7/2010 | Schoellhorn | |
| 7,770,895 B2 | 8/2010 | Zheng et al. | |
| 7,914,007 B2 | 3/2011 | Berard et al. | |
| 7,931,277 B2 | 4/2011 | Garrison | |
| 7,963,525 B1 | 6/2011 | Garrison | |
| 8,091,898 B2 | 1/2012 | Garrison | |
| 8,272,643 B2 | 9/2012 | Garrison et al. | |
| 8,408,556 B2 | 4/2013 | Vasagar et al. | |
| 8,905,407 B2 | 12/2014 | Ruggeri et al. | |
| 2008/0157479 A1 | 7/2008 | Vasagar et al. | |
| 2008/0272552 A1 | 11/2008 | Zheng et al. | |
| 2008/0284105 A1 * | 11/2008 | Vasagar | F16J 15/3244 |
| | | | 277/306 |
| 2010/0164183 A1 | 7/2010 | Berard et al. | |
| 2014/0197675 A1 | 7/2014 | Morman et al. | |
| 2014/0325791 A1 | 11/2014 | Colverson et al. | |
| 2015/0167846 A1 | 6/2015 | Haynes et al. | |

OTHER PUBLICATIONS

NASA Tech Brief 67-10325, "Segmented, Arch-Bound Carbon Seal is Pressure Loaded," Sep. 1967.

* cited by examiner

US 9,638,326 B2

ARCH-BOUND RING SEAL AND RING SEAL SYSTEM INCLUDING AN ARCH-BOUND RING SEAL

TECHNOLOGICAL FIELD

The present disclosure is directed to an arch-bound ring seal and to a system including a an arch-bound ring seal and a shaft, and, more specifically, to an arch-bound ring seal including structures for generating lift and to a system including an arch-bound ring seal including structures for generating lift and a shaft.

BACKGROUND OF THE INVENTION

Various devices are known for forming a seal between a rotatable shaft (or a sleeve or runner mounted on a rotatable shaft) and a stationary housing or other structure surrounding the shaft. Some seals make contact with the shaft to minimize leakage and may be referred to as "contact circumferential shaft seals." These seals include one or more seal rings with circumferential inner faces that contact the rotating sleeve and slide against the sleeve while it rotates. Such seals may be formed from compacted and sintered carbon graphite to provide heat and wear resistance, and they are often formed as a plurality of interconnectable ring segments to facilitate installation about the sleeve. The seal rings are held in place by a suitable retaining device, and a seal including such rings may include biasing devices, such as a circumferential or garter spring, for holding the seal segments together, and a plurality of axial compression springs to encourage side seating of the seal segments against the stationary housing.

While contact seals are durable and capable of withstanding high levels of heat and friction, sliding contact with a rotating sleeve eventually causes the seal rings to wear out. The rate at which the carbon rings wear is based in part on the relative speed of the sleeve and shaft, and in some high-efficiency jet engines, this speed, expressed as a linear velocity, can exceed 600 feet/second or about 400 miles/hour, for extended periods of time. The heat generated by contact at such speeds causes the seal rings to wear, and the rings therefore require frequent maintenance and/or replacement. The desire for longer operating life and higher thermal efficiency has moved the seal industry to look for alternatives to circumferential contact seals.

A solid bushing seal is one alternative to a circumferential contact seal. As the name implies, these seals are solid or unitary, and they avoid the problem of wear by maintaining a small spacing or gap between the shaft and the seal. However, shafts on which seals are used often expand due to thermal expansion and/or centrifugal force during use. In order to avoid damaging a solid bushing seal, the inner diameter of the seal must be large enough to remain spaced from the expanded shaft. This need to provide a gap results in a relatively large leakage rate at start up, when the shaft is cool. Moreover, if the gap is not large enough, the shaft may crack or otherwise damage the seal when it heats up and expands.

Another alternative to contact seals is the circumferential gas film seal. Much like the circumferential contact seal, this seal includes one or more carbon seal rings that exert a very light contact force against the shaft or sleeve when it is rotating and when it is not. The light contact force is achieved by routing high pressure gas to opposing faces through clearance spaces and milled cutouts. In the case of a contacting circumferential seal, the outer diameter of the ring is exposed across its entire width while the inside diameter is exposed across its entire width except for the width of a small sealing dam. This creates an imbalance in force that lightly seats the seal against the rotating sleeve. Producing a force balanced contact in this manner is referred to hydrostatic sealing, and a hydrostatic seal can be maintained both when the shaft is rotating and when the shaft is stationary.

Alternately or in addition, hydrodynamic sealing can be produced by forming recesses or cutouts on the side of the seal ring that faces the sleeve. As the sleeve rotates, air entrained by the rotating sleeve is compressed in these cutouts, and as it escapes over the non-recessed "pads" between the recesses, it produces an additional pressure and flow of air for maintaining a separation between the seal ring and the sleeve. A circumferential gas film seal is disclosed in co-pending U.S. patent application Ser. No. 14/132,571, "Bidirectional Lift-Off Circumferential Shaft Seal Segment and A Shaft Seal Including A Plurality of the Segments," the contents of which application is hereby incorporated by reference. Circumferential gas film seals generate less friction and less heat than circumferential contact seals, and thus generally last longer, require less maintenance and experience less oil cooling efficiency loss than contact seals.

There is an increasing demand for seals that can operate at higher temperatures and pressures. Modern jet engine designs require more robust seals that can operate at higher speeds, temperatures and pressures than ever before, and many conventional seals rapidly degrade under these conditions. Gas film seals in particular tend to suffer damage when used with a rotating shaft that is operated at the top end of its design range. Alternately, insufficiently robust seals prevent an engine from operating over its full range for fear of damaging the shaft seals.

At high speeds and pressures, the rotating shaft tends to rub against and damage the seal despite presence of the cutouts discussed above. That is, the seal is no longer able to maintain an adequate air film for supporting the seal, and the rotating shaft comes into contact with the seal. The geometry of the radially inner seal face changes as it wears and thereafter forms a less effective seal with the shaft surface when it drops back onto the shaft surface when the shaft is stopped. Repeatedly subjecting the shaft/seal interface to extreme conditions continues to damage the radially inner surface of the seal, and the damaged seal may eventually fail catastrophically when the geometry of the inner radial surface of the seal is no longer sufficient generate lift and keep the seal off the shaft.

SUMMARY

These and other problems are addressed by embodiments of the present disclosure, a first aspect of which comprises a ring seal for a shaft, the ring seal including a plurality of arc-shaped ring segments, each of the plurality of ring segments having a radially outer face, a radially inner face, a first axial side face, a second axial side face, a first end and a second end. The ring seal also includes a spring holding the plurality of arc-shaped segments in an arch-bound configuration, and the radially inner face of each of the plurality of ring segments includes at least one circumferential ramp configured to generate an air cushion when a shaft rotates inside the ring seal.

Another aspect of the disclosure comprises a ring sealing system that includes a shaft having an outer surface, a portion of the outer surface having an outer diameter, and a ring seal surrounding the shaft. The ring seal comprises a plurality of arc-shaped ring segments, each of the ring segments having a radially outer face, a radially inner face facing the portion of the outer surface, a first axial side face, a second axial side face, a first end and a second end. A spring holds the plurality of arc-shaped segments in an arch-bound configuration, and the inner diameter of the plurality of ring segments in the arch bound configuration is greater than the outer diameter of the portion of the shaft. The inner face of each of the plurality of ring segments includes a bleed slot extending from the first axial face toward the second axial face, and at least one recess is provided in the radially inner face in communication with the bleed slot and extending from the bleed slot in a circumferential direction.

A further aspect of the disclosure comprise a ring seal for a shaft, the ring seal including a ring member having at least one curved ring element and at least one joint. The at least one curved ring element has a radially outer face, a radially inner face, a first axial side face, a second axial side face, a first circumferential end and a second circumferential end, and the ring member is shiftable between an arch-bound configuration in which the first circumferential end of the at least one curved ring element contacts the second circumferential end of the at least one curved ring element and a non-arch-bound configuration in which the first circumferential end of the at least one curved ring element is circumferentially spaced from the second circumferential end of the at least one curved ring element. A spring is provided for holding the ring member in the arch-bound configuration, and the radially inner face of the ring member includes at least one circumferential ramp that is configured to generate an air cushion when a shaft rotates inside the ring seal.

BRIEF DESCRIPTION OF THE DRAWINGS

These and other aspects and features of the disclosure will be better understood after a reading of the following detailed description together with the attached drawings wherein.

DETAILED DESCRIPTION

Figure 1:
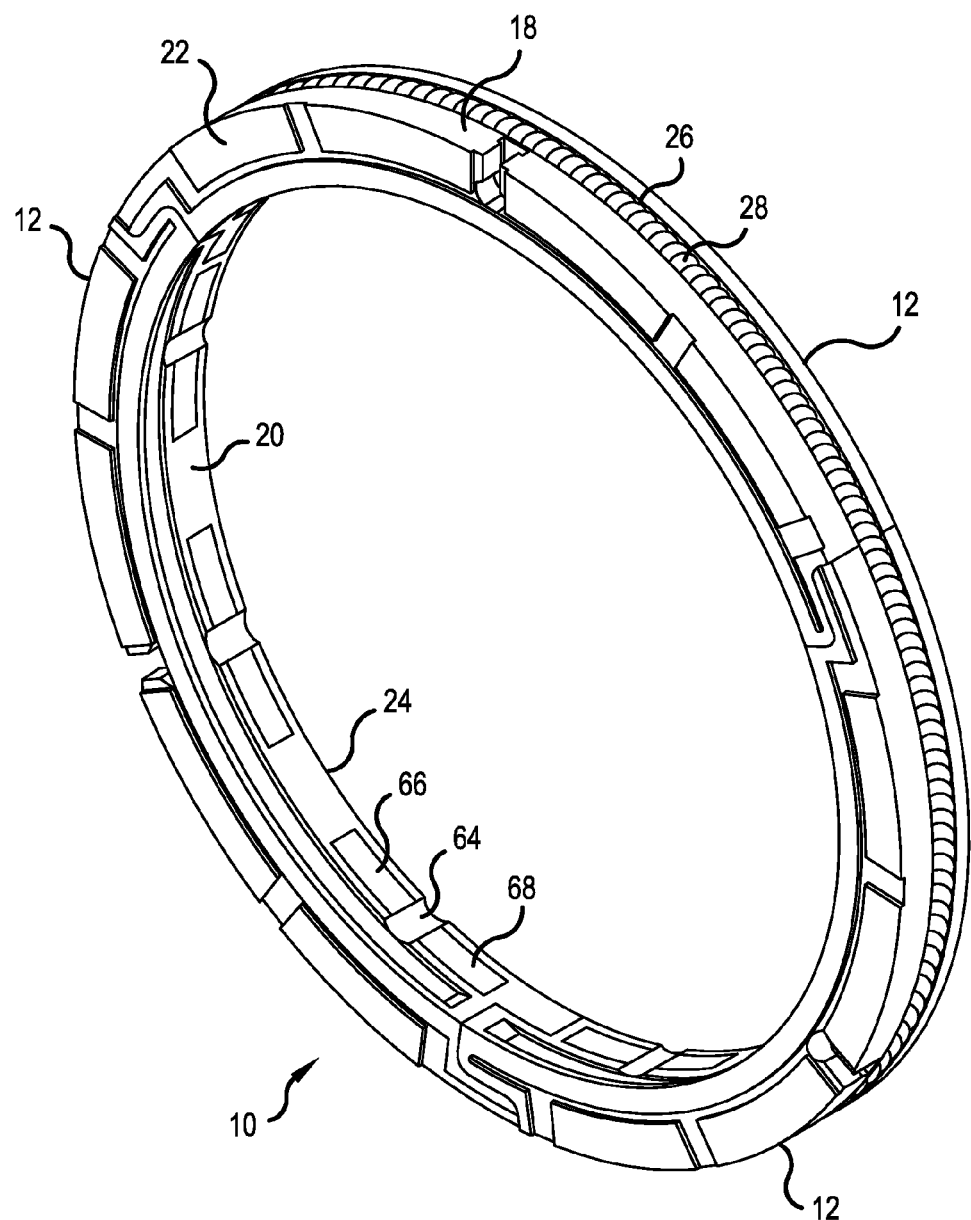
FIG. 1 is a perspective view of a ring seal formed from a plurality of ring segments according to the present disclosure.

Referring now to the drawings, wherein the showings are for the purpose of illustrating presently preferred embodiments of the disclosure only and not for the purpose of limiting same, FIG. 1 illustrates a ring seal 10 formed of a plurality of individual arc-shaped segments 12, three 120 degree segments, for example, suitably interconnected by joints described hereinafter. Each of the segments 12 has a first end 14 and a second end 16. In the present embodiment, the first end 14 may be referred to as the "female" end and the second end 16 may be referred to as the "male" end in view of their specific configurations; however, the first and second ends may be configured in other manners, discussed below, wherein the adjectives "male" and "female" may not apply.

The seal ring 10 (and each of the segments 12 that make up the seal ring 10) has a radially outer surface 18, a radially inner surface 20, a first axial side surface 22 and a second axial side surface 24. The radially outer surface 18 of each segment 12 includes a circumferential groove 26, and a circumferential or garter spring 28 is mounted in the circumferential groove 26 to hold the first ends 14 of the seal segments 12 against the second ends 16 of adjacent seal segments in an arch-bound manner to form the seal ring 10.

As used herein, "arch-bound" refers to the condition or configuration of a series of segments of a ring in which the ends of the segments are held in mutual contact in a circumferential direction by a radially inwardly directed force such that the radius of the ring cannot be further decreased in a non-destructive manner. The radially inwardly directed force may be produced, for example, by a spring such as garter spring 28. A radially outward force on the radially inner surfaces of the arch-bound segments may stretch the spring and produce small circumferential gaps between the ends of the ring segments 12, and in this configuration, the segments are no longer arch-bound; for convenience, this "not arch-bound" condition may be referred to as an "open" configuration. When the radially outward directed force is removed, the spring 28 pulls the segments 12 radially inwardly and returns them to an arch-bound configuration. Stated differently, in the arch-bound configuration, the segments 12 are held together by hoop stress.

Before discussing the specific configurations of the first and second ends 14, 16, it should be noted that these ends can assume a variety of different configurations within the scope of the present disclosure. For example, the first and second ends could potentially be planar, radial surfaces that meet in a face-to-face relationship when arc segments having such planar surfaces are in an arch-bound configuration. For most practical applications, however, such a configuration would not present a sufficient barrier to the passage of fluids axially through the seal, from the first axial side surface 22 to the second axial side surface 24, for example. Therefore, most applications require the first and second ends of the segments to be configured such that they do not present, or at least minimize, the number of linear axial paths through the joint formed between two seal segments. Many joint configurations (e.g., segment end shapes) are used for connecting conventional ring seal segments. Any joint configuration that supports an arch-bound mode of operation, that is, that allows the ring seal segments to meet and support a radially inwardly directed load while the seal operates, could potentially be used herein. A presently preferred embodiment for the first and second ends 14, 16 of the seal segment 12 is discussed below.

Figure 2:
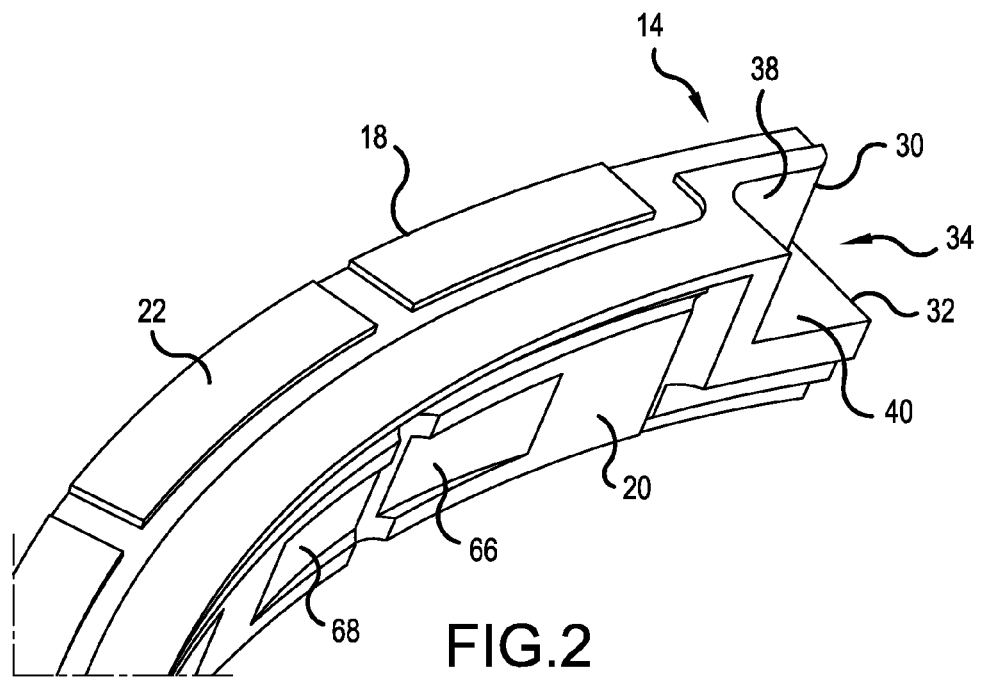
FIG. 2 is a first perspective view of a male end of one of the ring segments of FIG. 1.
Figure 3:
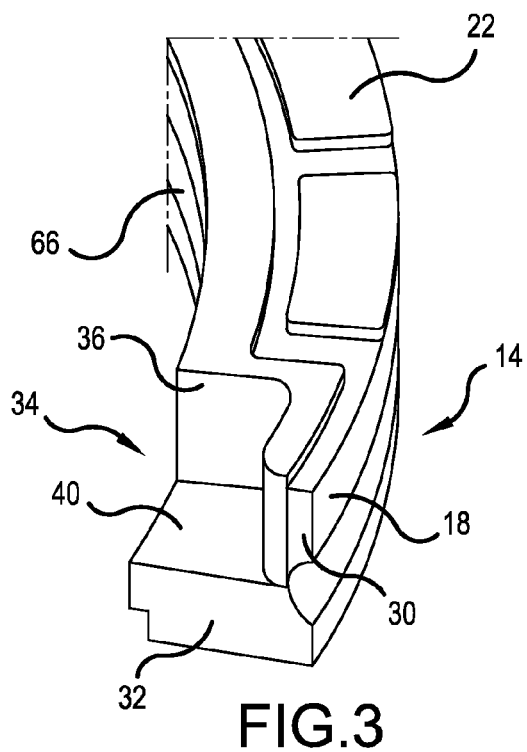
FIG. 3 is a second perspective view of the male end of FIG. 2.

FIGS. 2 and 3 show enlarged views of the first end 14 of one of the ring segments 12 of the ring 10. The first end 16 includes a first circumferentially outer end surface 30, a second circumferentially outer end surface 32 and a cutout 34 in the ring segment 12 circumferentially inward of the first end surface 30 and the second end surface 32. The cutout includes an inner circumferentially directed surface 36, a radially inwardly directed surface 38 and an axial surface 40 facing in the direction of the first axial side surface 22.

Figure 4:
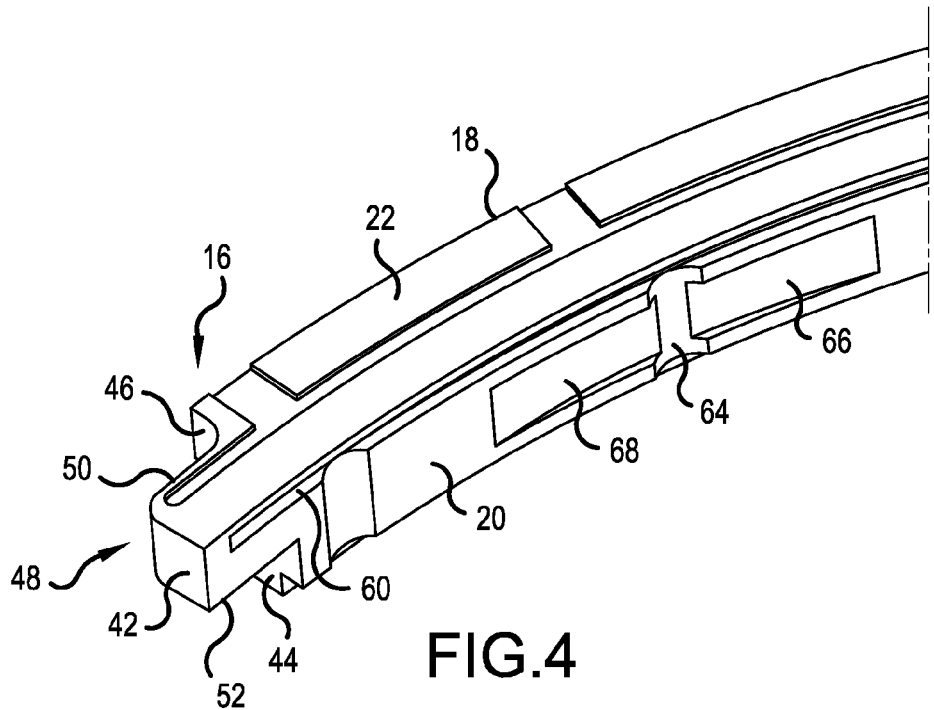
FIG. 4 is a first perspective view of a female end of one of the ring segments of FIG. 1.
Figure 5:
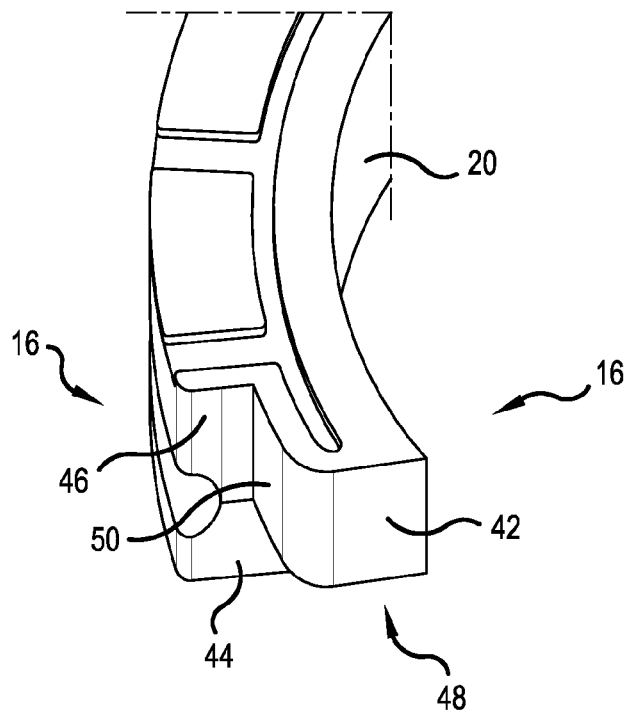
FIG. 5 is a second perspective view of the female end of FIG. 4.

FIGS. 4 and 5 show enlarged views of the second end 16 of one of the ring segments 12 of the ring 10. The second end includes a circumferentially outer end surface 42, a first, generally planar circumferentially inner end surface 44 and a second circumferentially inner end surface 46 adjacent the radially outer surface 18 that is somewhat concave and may be referred to as a pocket. The outer end surface 42 is located at the end of a projection 48 that, as discussed below, is receivable in the cutout 34 of the first or female end 14 of an adjacent ring segment 12. The projection 48 includes a radially outwardly directed surface 50 and an axially surface 52 facing in the direction of the second axial side surface 24.

Figure 6:
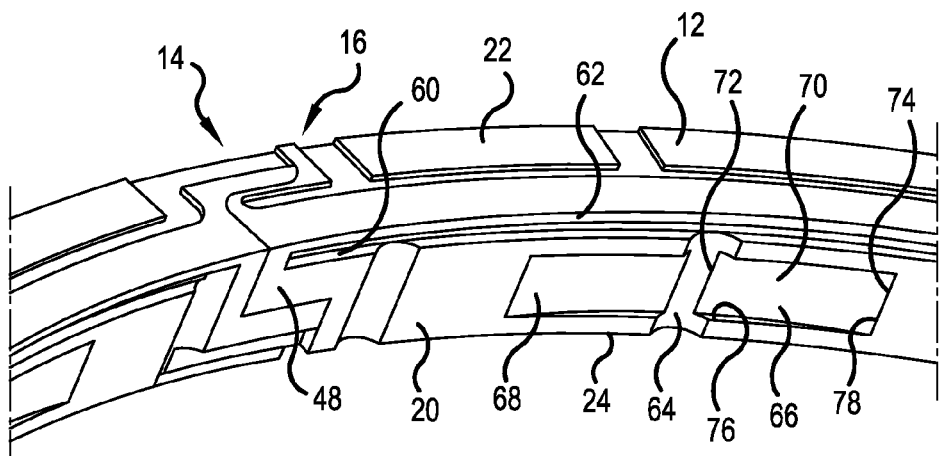
FIG. 6 is a detail view of a portion of the radially inner surface of the ring seal of FIG. 1.

Referring now to FIG. 6, the radially inner surface 20 of each seal segment 12 includes a circumferential groove 60 spaced axially inwardly from the first axial side surface 22 by a bore seal dam 62. These circumferential grooves 60 extend from a location near the first circumferential end 14 of the seal segment 12 to a point near the second circumferential end 16, but they do not reach the ends of the seal segment 12 and do not communicate directly with the circumferential grooves 60 of adjacent seal segments 12. A plurality of bleed slots 64 extend axially across the radially inner surface 20 of the seal segments 12 from the second axial side surface 24 to the circumferential groove 60, and the bleed slots 64 are distributed approximately evenly along the length of each seal segment 12 at a suitable spacing, such as every 10 degrees, for example. The bleed slots 64 have a cylindrical inner surface and have a substantially constant depth as they extend axially across the radially inner surface 20 to the circumferential groove 60.

Each of the bleed slots 64 has an associated first recess 66 and a second recess 68 that extend in circumferentially opposite directions therefrom. In this embodiment, the first and second recesses 66, 68 are identical and therefore only the first recess 66 will be described. The first recess 66 comprises a ramp 70 that extends circumferentially from a first end 72 at the bleed slot 64 toward a second end 74 circumferentially spaced from the bleed slot 64. First and second axially spaced side walls 76 extend from either axial side of the ramp 70 to the radially inner surface 20 of the seal ring 10, and an end wall 78 connects the axially spaced side walls 76 at the second end 74 of the first recess 66. The depth of the first recess 66 decreases monotonically from the first end 72 at the bleed slot 64 to the second end 74 thereof and has a first depth at its first end 72 and a second depth at its second end 74 which is less than the first depth. The axial width of the first recess 66 between the first and second axial side walls 76 may be, for example, approximately half of the axial width of the seal ring 10 between the first axial side surface 14 and the second axial side surface 16.

The ring 10 of FIG. 1 is assembled from three of the segments 12 in the manner described below. However, the present disclosure is not limited to the use of three seal segments, and embodiments having a greater or lesser number of segments are also possible. The selected number of seal segments is generally odd, 1, 3, 5, 7 or 9, for example, but an even numbers of segments can also be used. The number of seal segments selected for a given application depends on a number of factors, but primarily on the size, that is, the diameter of the ring being formed. Larger rings generally benefit from greater numbers of segments for reasons of manufacturability and ease of assembly. A very small ring, on the other hand, could be formed from a single split segment having two ends that are held together in an arch-bound configuration and that can be separated to shift the ring into a non-arch-bound configuration.

Figure 7:
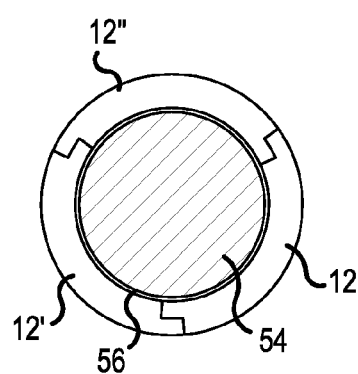
FIG. 7 is an elevational view, partly in section, of the ring seal of FIG. 1 mounted in an arch-bound configuration on a shaft.

Referring now to FIG. 7, the ring 10 of the present embodiment is assembled around a shaft 54 by taking first, second and third seal segments 12, 12' and 12" and inserting the projections 48 of the second ends 16 of each ring segment 12, 12', 12" into the cutouts 34 of the first ends 14 of adjacent seal segments and placing the garter spring 28 around the ring 10 to hold the ring segments 12, 12', 12" in an arch-bound configuration.

Figure 8:
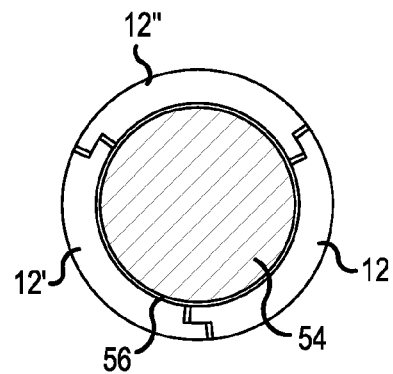
FIG. 8 is an elevational view, partly in section, of the ring seal and shaft of FIG. 7 with the seal in an open or non-arch-bound configuration.

In the arch-bound configuration, illustrated in FIG. 7, the circumferential outer end surface 42 of each projection 48 is pressed against the inner circumferentially directed surface 36 of each cutout 34. The radially inwardly directed forces produced by the garter spring 28 are thus distributed circumferentially. The radially outwardly directed surface 50 of the projection 48 is in contact with the radially inwardly directed surface 38 of the cutout 34 of an adjacent ring segment 12, and the axial surface 52 of the projection 48 is in contact with the axial surface 40 of the cutout 34. The first circumferential outer end surface 30 of the first end 14 of the segment 12 mates with the pocket formed at the second circumferential end surface 44. This configuration ensures that gas traversing the seal 10 must change direction at least once as it travels in the axial direction and substantially resists the passage of gas axially through the seal 10 when the seal is in the arch-bound configuration. Even in the non-arch bound configuration of FIG. 8, discussed below, in which the circumferential outer end surface 42 of each projection 48 is slightly circumferentially spaced from the inner circumferentially directed surface 36 of each cutout 34, the face-to-face contact of the radially outer directed surface 50 of the projection 48 and the radially inwardly directed surface 38 of the cutout 34 and face-to-face contact of the axial surface 52 of the projection 48 and the axial surface 40 of the cutout 34 helps keep leakage to an acceptable level.

In use, the seal segments 12 are assembled into a seal ring 10 about a shaft 54 as illustrated in FIG. 7. In this configuration, the seal segments 12 are arch-bound and do not contact the surface 56 of the shaft 54 (or a runner or sleeve, not illustrated, on the surface of the shaft 54). Instead, the radially inner surface 20 of the ring seal 10 is radially spaced from the surface 56 of the shaft 54 by gap of, for example, about 0.0005 inches (about 12.7 μm) which results in an opening between the shaft 54 and the ring seal 10 of about 0.004 square inches (about 0.1 millimeter). This gap results in increased leakage as compared with conventional contact seals, but reduces heat generation because the ring 10 is not in contact with the shaft 54 under low speed (e.g., start up) conditions.

As the shaft 54 accelerates to operating speed, temperature and pressure in the vicinity of the shaft and seal increase, and the diameter of the shaft 54 increases as its temperature and speed increase. However, rather than reach the radially inner surface 20 of the ring 10, the recesses 66 and 68 in the radially inner surfaces 20 of the seal segments 12 generate lift and cause the seal segments 12 to move radially outward against the radially inward pressure of the garter spring 28 and open the joints between the segments 12 in a circumferential direction (or open the joint between the ends of the ring when a single, split, segment is used). That is, as the speed of the shaft 54 increases, air or other gas is entrained by the rotating shaft 54 and is compressed in the first recesses 66. The compressed air escapes past the end wall 78 and over the side walls 76 of the first or second recess 66, 68 and flows over the radially inner surface 20 of the seal ring 10 and creates a film or cushion of air. This film or cushion substantially prevents the outer surface of the shaft 54 from coming into contact with the radially inner surface 20 of the seal 10.

Many applications require that engines using such shaft seals be driven in a manner that severely stresses the seals. Specifically, engine operating modes may be encountered during which the heat and speed of the shaft 54 are so great that the expanding shaft 54 is driven into contact with the inner circumferential surface 20 of the seal ring 10; that is, the conditions are so extreme that the first and second recesses 66, 68 are can no longer generate adequate lift to maintain a separation between the shaft 54 and the seal 10. In this case, the shaft will contact the seal 10 and generate heat. At the same time, the rotating shaft 54 will cause the seal ring 10 to wear. This in turn, may change the geometry of the first and second recesses 66, 68, i.e., reduce their depths, to an extent that they cannot provide as much lift as before. Each time an engine using such seals is operated, therefore, the seal may be less able to generate lift and is likely to be subject to even more wear when the shaft is operated at the extreme end of a designed operating range.

Conventional gas film contact seals operated under such extreme conditions would likely fail to lift off the rotating shaft at start up once lift generating recesses in their inner surfaces were worn. This could lead to a catastrophic failure. However, beneficially, the presently disclosed arch-bound ring does not contact the shaft at start up or other low temperature conditions, and maintains a gap between the seal and the shaft at all times. Therefore, even after the radially inner surface 20 of the ring 10 has started to wear due to the extreme conditions discussed above, it can continue to operate and perform a needed sealing function, both at start up and under operating conditions. By sacrificing some amount of sealing function at low speeds, the seal 10 is better able to resist the damage caused by extreme operating conditions and remain effective the next time the engine using such a seal is started.

The present invention has been described above in terms of presently preferred embodiments. Modifications and additions to these embodiments will become apparent to persons of ordinary skill in the art upon a reading of the foregoing description. It is intended that all such modifications and additions comprise a part of the present invention to the extent they fall within the scope of the several claims appended hereto.

What is claimed is:

1. A ring seal assembly comprising:
a shaft having an outer circumferential surface with a diameter;
a plurality of arc-shaped ring segments mounted around the outer circumference shaft and forming a ring seal with an innermost diameter, each of the plurality of ring segments having a radially outer face, a radially inner face, a first axial side face, a second axial side face, a first circumferential end and a second circumferential end, the plurality of ring segments being shiftable between an arch-bound configuration wherein the first circumferential end of each ring segment circumferentially contacts the second circumferential end of an other ring segment of the plurality and a non-arch-bound configuration wherein the first circumferential end of each ring segment is circumferentially spaced from the second circumferential end an other ring segment of the plurality, and that the innermost diameter of the ring seal is greater in the non-arch-bound configuration than in the arch-bound configuration;
a spring biasing the plurality of arc-shaped ring segments toward the arch-bound configuration; and
at least one circumferential ramp in the radially inner face of each of the plurality of ring segments configured to generate an air cushion when the shaft rotates inside the ring seal to radially expand the innermost diameter of the ring seal by transitioning the plurality of ring segments from the arch-bound configuration to the non-arch-bound configuration,
wherein the ring segments are sized such that the radially inner faces of the ring segments are radially spaced from the outer circumferential surface of the shaft by a gap while in the arch-bound configuration so that the ring seal is not in contact with the shaft under low rotational speed and shaft startup conditions.

2. The ring seal assembly according to claim 1, wherein the radially inner face of each of the plurality of ring segments includes a bleed slot extending from the first axial side face toward the second axial side face and wherein the ramp extends from the bleed slot.

3. The ring seal assembly according to claim 2, wherein the circumferential ends of each of the plurality of ring segments each include at least one circumferentially facing surface, at least one radially facing surface and at least one axially facing surface.

4. The ring seal assembly according to claim 2, wherein the plurality of ring segments comprises at least three ring segments.

5. The ring seal assembly according to claim 1,
wherein the radially inner face of each of the plurality of ring segments includes a bleed slot extending from the first axial side face toward the second axial side face,
wherein the ramp extends from the bleed slot,
wherein the ramp comprises a floor of a notch formed in the radially inner face, and
wherein the circumferential ends of each of the plurality of ring segments each include at least one circumferentially facing surface, at least one radially facing surface and at least one axially facing surface.

6. A ring sealing system comprising:
a shaft having an outer surface, a portion of the outer surface having an outer diameter;
a ring seal surrounding the portion of the outer surface of the shaft and having an innermost diameter, the ring seal comprising a plurality of arc-shaped ring segments, each of the plurality of ring segments having a radially outer face, a radially inner face facing the portion of the outer surface of the shaft, a first axial side face, a second axial side face, a first circumferential end and a second circumferential end, the plurality of ring segments being shiftable between an arch-bound configuration wherein the first circumferential end of each ring segment circumferentially contacts the second circumferential end of an other ring segment of the plurality and a non-arch-bound configuration wherein the first circumferential end of each ring segment is circumferentially spaced from the second circumferential end an other ring segment of the plurality, and that the innermost diameter of the ring seal is greater in the non-arch-bound configuration than in the arch-bound configuration; and
a spring biasing the plurality of arc-shaped ring segments toward the arch-bound configuration,
the innermost diameter of the ring seal in the arch-bound configuration being greater than the outer diameter of the portion of the outer surface of the shaft on which the ring seal is mounted such that the radially inner faces of the ring segments are radially spaced from the portion of the outer surface of the shaft by a gap while in the arch-bound configuration so that the ring seal is not in contact with the shaft under low speed shaft rotation and shaft startup conditions, and wherein higher speed shaft rotation conditions cause radial outward lift such that the plurality of ring segments shift from the arch-bound configuration to the non-arch-bound configuration;

the radially inner face of each of the plurality of ring segments including a bleed slot extending from the first axial side face toward the second axial face, and including at least one recess in the radially inner face in communication with the bleed slot and extending from the bleed slot in a circumferential direction.

7. The ring sealing system according to claim 6, wherein the portion of the outer surface of the shaft comprises a runner.

8. The ring sealing system according to claim 7, wherein the at least one recess of each of the plurality of ring segments is configured to generate an air cushion between the runner and the radially inner faces of the plurality of ring segments when the runner rotates, and wherein the ring seal is configured to shift from the arch-bound configuration to a non-arch-bound configuration in response to a pressure generated by the air cushion.

9. The ring sealing system according to claim 6, wherein each recess comprises a ramp extending into the radially inner face of the respective ring segment in which each recess is located.

10. The ring sealing system according to claim 6,
wherein the portion of the outer surface of the shaft comprises a runner,
wherein the at least one recess of each of the plurality of ring segments is configured to generate an air cushion between the runner and the radially inner faces of the plurality of ring segments when the runner rotates, and wherein the ring seal is configured to shift from the arch-bound configuration to a non-arch-bound configuration in response to a pressure generated by the air cushion, and
wherein each recess comprises a ramp extending into the radially inner face of the respective ring segment in which each recess is located.

11. A ring seal assembly comprising:
a shaft having an outer circumferential surface with a diameter;
a ring seal surrounding the shaft, the ring seal having an innermost diameter and including a plurality of curved ring segments and a plurality of joints, each ring segment having a radially outer face, a radially inner face, a first axial side face, a second axial side face, a first circumferential end and a second circumferential end, the ring seal being shiftable between an arch-bound configuration wherein the first circumferential end of each curved ring segment circumferentially contacts the second circumferential end of an other one of the curved ring segments and a non-arch-bound configuration wherein the first circumferential end of each curved ring segment is circumferentially spaced from the second circumferential end of an other one of the curved ring segments, and the innermost diameter of the ring seal is greater in the non-arch-bound configuration than in the arch-bound configuration;
a spring biasing the ring seal toward the arch-bound configuration; and
at least one circumferential ramp in the radially inner face of each curved ring segment configured to generate an air cushion when the shaft rotates inside the ring seal to radially expand the innermost diameter of the ring seal by transitioning the ring seal from the arch-bound configuration to the non-arch-bound configuration;
wherein the ring segments are sized such that the radially inner face of each element is radially spaced from the outer circumferential surface of the shaft by a gap while in the arch-bound configuration so that the seal is not in contact with the shaft under low rotational speed and shaft startup conditions.

12. The ring seal according to claim 11, wherein the plurality of curved ring segments comprises at least three curved ring segments.

13. The ring seal according to claim 11, wherein the spring is formed from a material different than a material the ring seal is formed from and extends circumferentially across the plurality of joints.

* * * * *